Dec. 5, 1944.                    E. A. THORSBERG                    2,364,328
                        ATTACHMENT FOR MILLING MACHINES
                         Filed March 17, 1943          2 Sheets-Sheet 1

INVENTOR.
Eric A. Thorsberg
BY
Richard Geier
ATTORNEYS

Dec. 5, 1944. E. A. THORSBERG 2,364,328
ATTACHMENT FOR MILLING MACHINES
Filed March 17, 1943  2 Sheets-Sheet 2
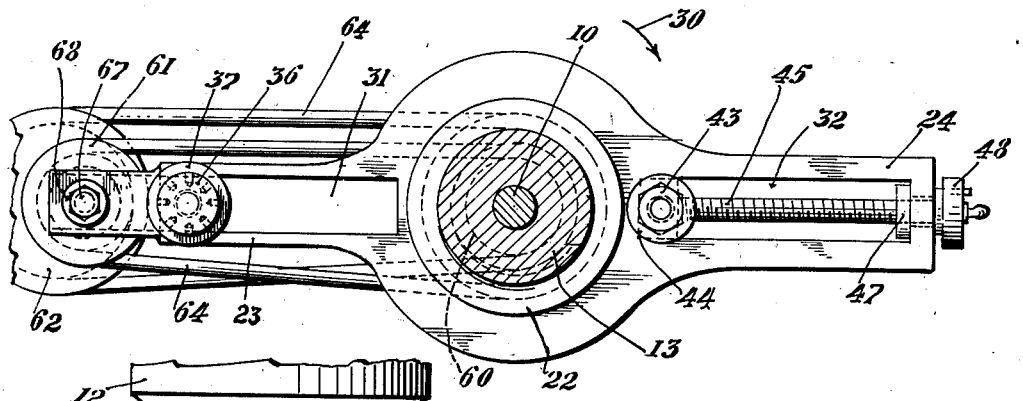
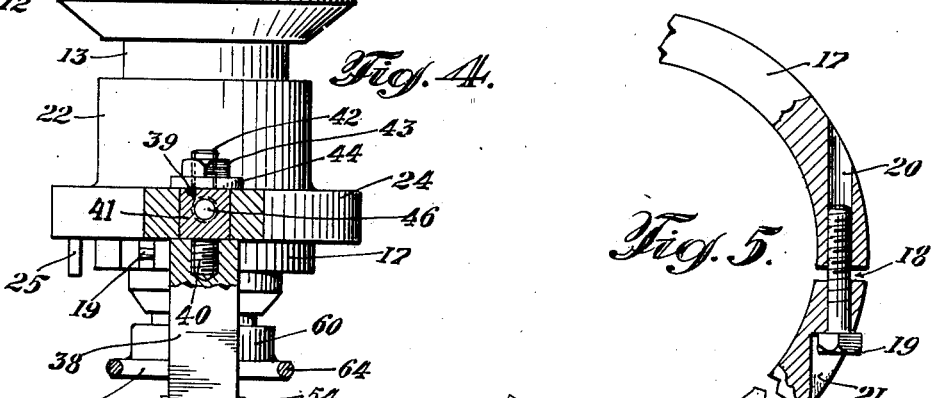
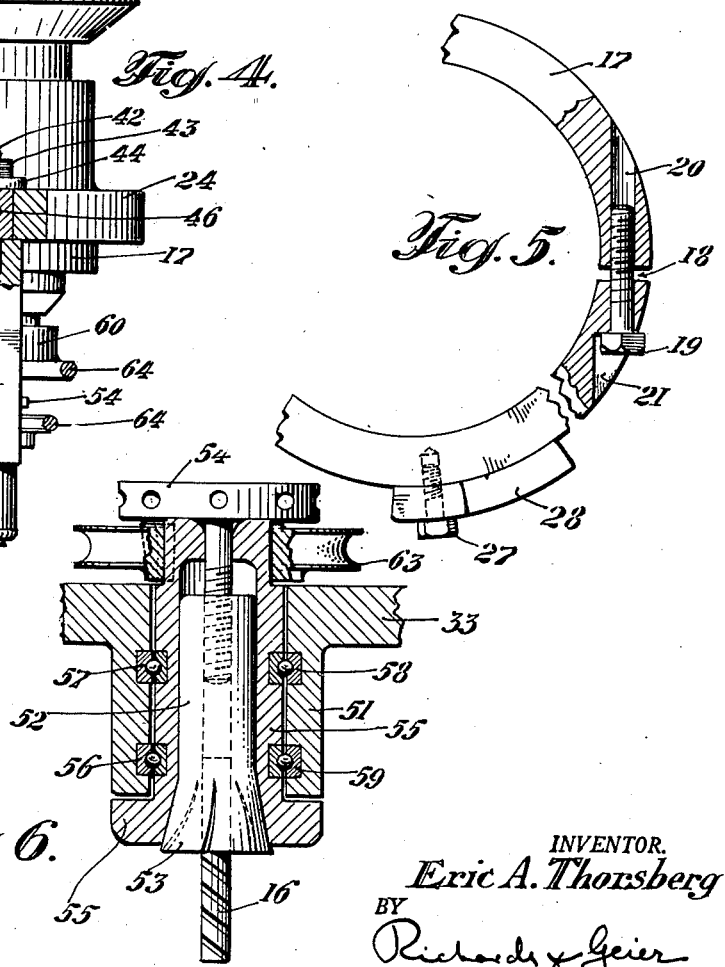
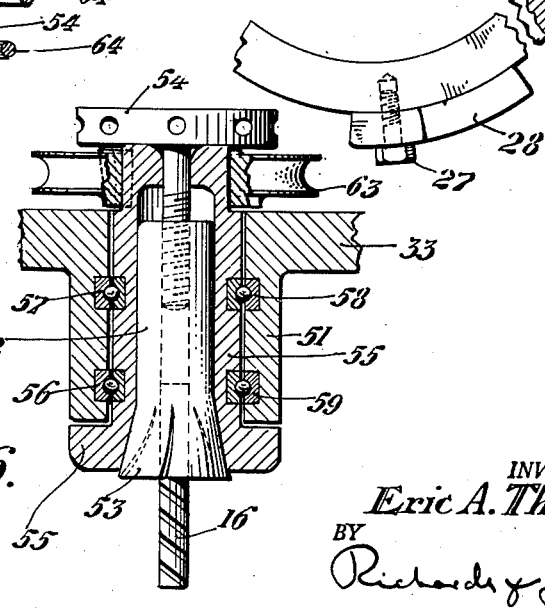
INVENTOR.
Eric A. Thorsberg
BY
Richards y Geier
ATTORNEYS Patented Dec. 5, 1944

2,364,328

UNITED STATES PATENT OFFICE 2,364,328

ATTACHMENT FOR MILLING MACHINES

Eric A. Thorsberg, Mahopac, N. Y.

Application March 17, 1943, Serial No. 479,427

4 Claims. (Cl. 90—15)

This invention relates to an attachment for milling machines.

Milling machines are used to shape outer or inner side surfaces of a work piece. Modern industry requires articles and dies which have a large number of curved surfaces located within the article or on the outside thereof and usually disposed symmetrically in relation to each other. Milling drills rotated around their axes by the motor of the milling machine are used to form and shape these surfaces which extend vertically or at an acute angle to the axis of the drill.

Heretofore whenever a work piece, having a large number of surfaces, was to be worked upon a milling machine, it was necessary to attach the work piece to the work table in such a manner that the center of the curvature of the surface to be milled coincided with the center of the table. Then the table with work attached thereto was swung around the milling drill until the surface was milled properly. Thereupon the work had to be interrupted, and the work piece had to be shifted upon the work table until the center of curvature of the next surface to be milled coincided with the center of the table. It is apparent that if the work piece contains a large number of surfaces to be milled, the time required for the various settings of the work piece would be very great and entirely out of proportion to the time consumed in the actual milling operations.

An object of the present invention is to eliminate the time wasted in setting a work piece, through the provision of a device which will make it unnecessary to shift the work piece upon the table for every different milling operation.

Another object is the provision of an attachment for milling machines through the use of which it is possible to mill quickly and effectively work pieces provided with a large number of complicated curved surfaces.

The other objects of the present invention will become apparent in the course of the following specification.

In accordance with the present invention, the milling tool is caused to move or swing in relation to the work instead of the reverse arrangement used in prior art.

Let it be assumed that an operator is required to mill a plurality of curved surfaces disposed at equal angles in relation to each other. In accordance with the present invention, an attachment is used which carries the milling tool and which is provided with means for shifting the position of the milling tool to a predetermined distance from the center of the machine, as well as with means for swinging the entire attachment relatively to the machine.

With the milling tool in its zero position, namely, in alignment with the central axis of the machine, the operator firmly attaches the work piece to the table in such manner that the center of a curved surface to be milled is located directly below the tool. Then the tool is shifted by operating the attachment to a distance equal to the radius of the surface to be milled. The setting operation is then completed, and the operator can mill the surface by swinging the attachment carrying the tool.

When the milling of this surface has been completed, the milling of the next surface may proceed as soon as the table carrying the work has been rotated to an angle equal to the angular distance between the two surfaces.

The invention will appear more clearly from the following detailed description when taken in connection with the accompanying drawings, showing, by way of example, a preferred embodiment of the inventive idea.

In the drawings:

Figure 3 is a top view along the line 3—3 of Figure 1.

Figure 4 is a section along the lines 4—4 of Figure 1.

Figure 5 illustrates, on an enlarged scale, a portion of the ring which supports the attachment and which is shown in Figure 1.

Figure 6 is a section showing, on an enlarged scale, the means holding the milling tool.

Figure 1:
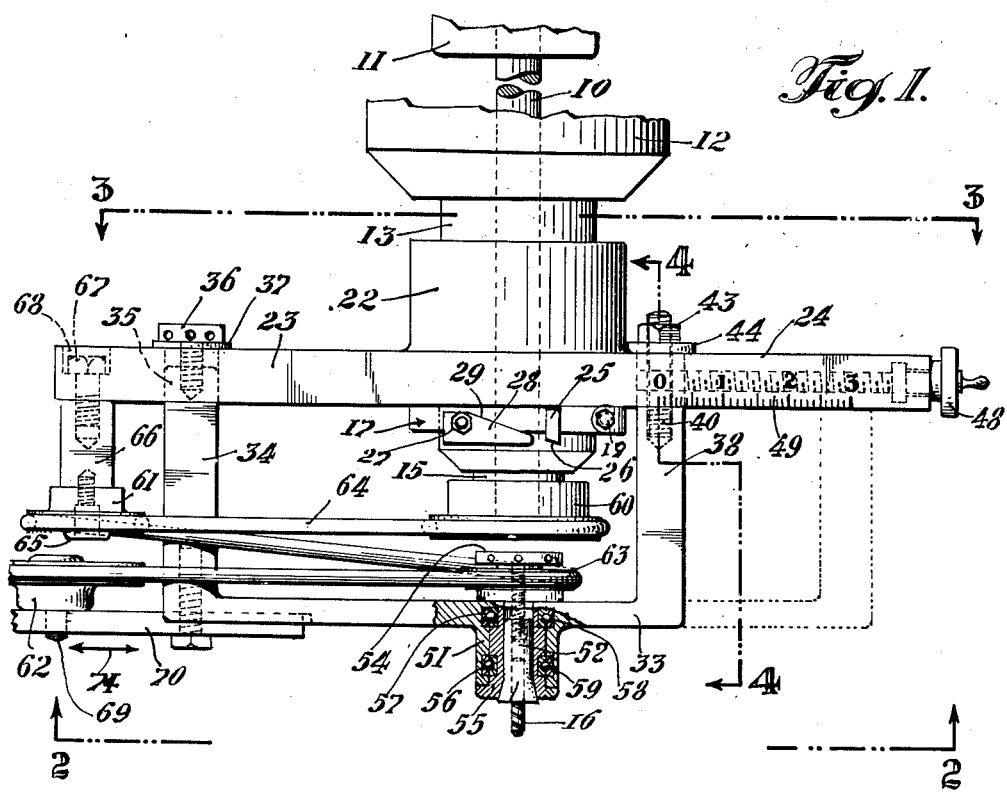
Figure 1 is a side elevation partly in section of a milling attachment constructed in accordance with the principles of the present invention.

The attachment shown in the drawings can be adapted to any existing milling machines since it does not require any considerable alterations of such machine.

The illustrated milling machine includes a vertical shaft 10, which is driven by any suitable motor 11, illustrated diagrammatically in Figure 1. The shaft 10 extends through a casing 12, and a sleeve 13. The lower end of the shaft 10 is enclosed by an end sleeve 15 which is keyed upon the lower end of the shaft and is rotatable therewith.

The above described parts constitute elements of the usual milling machine wherein a milling tool 16 is driven directly by the shaft 10, and is in alignment therewith.

In accordance with the principles of the present invention, the milling tool 16 is separated from the shaft 10, and is carried by a separate attachment. This attachment is freely and rotatably supported by a ring 17 which is mounted upon the sleeve 13, close to the lower end of the sleeve.

As shown in greater detail in Figure 5, the ring 17 is a spliced ring having a slot 18 so that it can be tightened by a bolt 19 screwed into a threaded passage 20 extending across the slot 18. The head of the bolt 19 fits within a recess 21 provided in the ring 17.

By tightening the bolt 19, the ring 17 may be held firmly upon the sleeve 13 and will embrace the sleeve with sufficient force to support the weight of the attachment carried thereby.

This attachment includes a sleeve 22 which is adapted to embrace the sleeve 13, and which is integral with a horizontal plate having portions 23 and 24 extending on opposite sides of the sleeve 22. Reducers not shown in the drawings may be inserted into the sleeve 22 in order to make it possible to use the attachment with any existing type of milling machines having spindles 10 and sleeves 13 of different sizes. The frame composed of the parts 22, 23 and 24 extends with sufficient play over the sleeve 13 so that the operator can swing it conveniently upon its supporting ring 17. The frame parts 23 and 24 may be conveniently grasped by the operator while the frame is being swung.

The lower surface of the sleeve 22 may carry a downwardly projecting pin 25, having a slanting lower surface 26. The ring 17 may be provided with one or more threaded openings receiving a bolt 27 which carries an attachment piece 28. The piece 28 is provided with a slanting surface 29 adapted to cooperate with the surface 26 of the pin 25.

It is apparent that if the attachment is rotated in the direction of the arrow 30, shown in Figure 3, the pin 25 will eventually strike the attachment piece 28, and in the course of further rotation, the pin will ride upwardly upon the slanting surface 29 of the piece 28. Then the entire attachment will be raised in relation to a work piece. Thus the purpose of the attachment pieces 28 is to raise and lower the milling tool 16, while carrying out the milling operations and thereby making it possible to mill along slanting surfaces. The ring 17 may be provided with any suitable number of openings adapted to carry pieces 28. These pieces may be conveniently removed and replaced by others, depending upon the type of work which the milling tool is required to perform.

As shown in Figure 3, the frame part 23 is provided with an elongated slot 31, while the frame part 24 has an elongated slot 32. The two slots receive the ends of a miller-carrying U-shaped frame element 33 which may be conveniently shifted in relation to the frame element 22 to place the milling tool 16 at a predetermined distance from the center of the machine.

The frame element 33 has an arm 34 provided with an upper end 35 which fits into the slot 31 of the frame portion 23. The end piece 35 is provided with a vertical threaded bore hole so that it can receive a bolt 36, mounted upon a washer 37. Preferably, the bolt 36 is of the type which has a cylindrical head provided with radial tool-engaging openings.

Another vertical arm 38 of the frame element 33 terminates below the slot 32 of the frame element 24. However, the arm 38 carries a piece 39 having a bolt portion 40 which is firmly screwed into the upper end of the arm 38. The intermediate portion 41 of the member 39 is substantially rectangular in form and fits into the slot 32 of the frame element 24.

The member 39 is also provided with an upper threaded bolt portion 42 which carries a nut 43 provided with a washer 44.

It is apparent that the bolt 36 and the nut 43 hold the frame element 33 firmly in any desired position. However, when the bolt 36 and the nut 43 are unscrewed or loosened, the frame element 33 may be shifted in relation to the frame elements 22, 23 and 24 through the use of a threaded rod 45, the inner end of which meshes with the threads of an opening 46, provided in the rectangular portion 41 of the piece 39.

The other end of the threaded rod 45 extends through an end portion of the frame element 24 and carries an inner distancing sleeve 47 and an outer hand-operated wheel 48 which are both keyed upon the rod 45.

As shown in Figure 1, the frame portion 21 may be provided with a scale 49. In the position shown in the drawings, the milling tool 16 is located in its zero position in which it is situated directly below the driving shaft 10. An operator, by loosening the bolt 36, and the screw 43, and rotating the hand wheel 48, may shift the frame element 33 and the milling tool 16 carried thereby to any desired distance which will be indicated upon the scale 49.

The lower portion of the frame element 33 is provided with a wide opening 50. The purpose of this opening is to facilitate the centering of a work piece (not shown) in relation to the main spindle 10. It is customary to use a wriggler for this purpose, and this wriggler may be conveniently extended through the opening 50 and down toward the table of the machine which may be the same as in all existing milling machines, and which is not shown in the drawings.

The attachment of the milling tool 16 to the frame element 33 is shown in Figures 1 and 6. The frame element 33 is integral with a vertically extending sleeve 51, while the milling tool 16 is inserted into a holding nut 52, having a spliced head 53, and provided with a threaded end portion which holds the threaded end of a bolt 54. A sleeve 55 separates the sleeve 51 from the member 52. The sleeve 55 is rotatable along with the milling tool 16 and the member 52, and is separated from the sleeve 51 by roller bearings 56 to 59.

The milling tool 16 is driven from the main spindle 10 through the intermediary of a belt drive which extends over four pulleys 60 to 63.

The pulley 60 is keyed upon a sleeve 15 which rotates along with the spindle 10. An endless belt 64 extends over the pulley 60 and also over the pulley 61. The pulley 61 is mounted upon a threaded pin or pivot 65 which is screwed into a vertical support 66. The support 66 is attached to the frame element 23 by a bolt 67 which extends through the frame element 23 and is screwed into the support 66. The head of the bolt 67 is located in a recessed portion 68 of the frame element 23.

The endless belt 64 extends also from the pulley 61 to the pulley 63. The pulley 63 is keyed upon the sleeve 55 which embraces the member 52 holding the milling tool 16.

Figure 2:
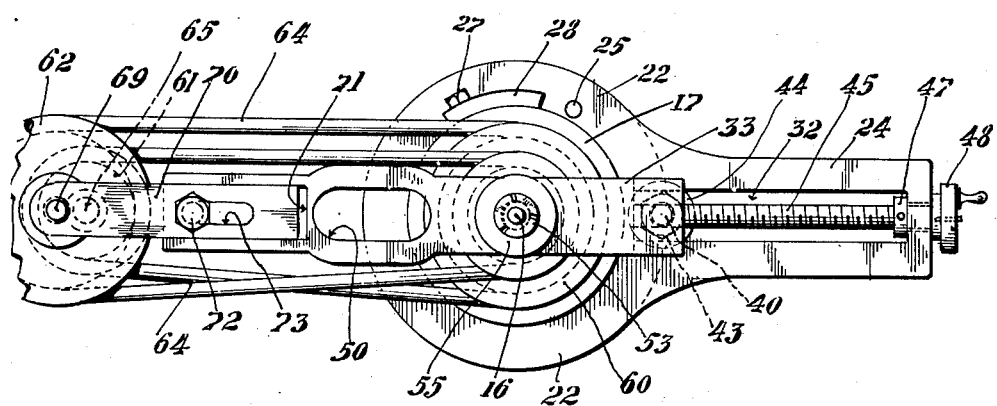
Figure 2 is a bottom view along the line 2—2 of Figure 1.

The endless belt also extends over a pulley 62 which is mounted upon a pivot 69, carried by a plate 70. As shown in Figure 2, the plate 70 fits into a recess 71 provided in the frame element 33. The plate 70 is connected to the frame element 33 by means of a bolt 72 which extends through an opening 73 provided in the plate 70 and which is screwed into the frame element 33. The opening 73 is elongated in form so that the plate 70 may be conveniently adjusted in the direction of the arrows 74, thereby providing a suitable arrangement for increasing or relaxing the tension of the endless belt transmitting the drive of the spindle 10 to the milling tool 16.

The operation of the described attachment is apparent from the above description. Whenever a work piece with a plurality of symmetrically disposed curved surfaces is to be milled, the attachment may be readily used to mill these surfaces and thereby diminish, to a substantial extent, the time necessary for the setting and attaching operations. Practical experience has shown that in the case of a work piece having ten curved surfaces, ten settings were required when following prior art practice with the result that the milling operations consumed two days. By means of the applicant's device, which requires a single setting, the same work piece can be milled in the same manner in not more than one half hour.

In accordance with the applicant's arrangement, the work table (not shown) carrying the work piece, is shifted until the center of a surface to be milled is placed directly below the milling tool 16 which, at that time, is located in its zero position, illustrated in Figure 1. Then the operator turns the hand wheel 48 thereby rotating the threaded rod 45, and shifting the frame element 33 along with the piece 39, meshing with the rod 45. The frame element 33 carrying the milling tool 16 is shifted to an extent indicated upon the scale 49, which is equal to the radius of the surface to be milled. Then the machine is ready for use and the operator can carry out the milling of one of the curved surfaces in the described manner by swinging the attachment carried upon the ring 17.

When the milling of one surface is completed, the operator rotates the table, carrying the work piece, to an extent equal to the angular distance between the two surfaces to be milled. Then the operation is repeated.

It is apparent that the specific illustration shown above has been given by way of illustration and not by way of limitation, and that the structures above described are subject to wide variation and modification without departing from the scope or intent of the invention, all of which variations and modifications are to be included within the scope of the present invention.

What is claimed is:

1. An attachment for a milling machine, comprising in combination with a central sleeve constituting a part of the milling machine; a holder for a milling tool, a frame having a sleeve portion embracing said central sleeve, a ring clamped upon said central sleeve and supporting the sleeve portion of said frame, and means positively connecting said holder with said frame and shifting said holder in relation to said frame from a position directly below the center of said central sleeve to a distance equal to the radius of the surface to be milled.

2. An attachment for a milling machine, comprising in combination with a central sleeve constituting a part of the milling machine; a holder for a milling tool, a frame having a sleeve portion embracing said central sleeve, a ring clamped upon said central sleeve and supporting the sleeve portion of said frame, an attachment piece carried by said ring and having a slanting surface, a pin extending downwardly from the sleeve portion of the frame and having an end adapted to slide upon said slanting surface to raise and lower the frame in relation to said ring, and means positively connecting said holder with frame and shifting said holder in relation to said frame from a position directly below the center of said central sleeve to a distance equal to the radius of the surface to be milled.

3. An attachment for a milling machine, comprising a holder for a milling tool, a frame comprising a sleeve the central axis of which coincides with that of the milling machine, and two projecting portions extending on opposite sides of said sleeve, each of said projecting portions having an elongated slot formed therein, a U-shaped support having a central portion carrying said holder, an arm portion including an end situated in one of said slots, and another arm portion including a member situated in the other one of said slots, detachable means for holding the two arm portions in said slots, the projecting portion provided with said slot having a scale for indicating the position of said holder, and means engaging said member for shifting said support and said holder from a position directly below the central axis of said sleeve to a distance equal to the radius of a surface to be milled, said frame being swingable about the central axes of the sleeve.

4. An attachment for a milling machine, comprising in combination with a vertical driving shaft of said milling machine and a sleeve member enclosing said shaft; a frame having a sleeve embracing said sleeve member and carried thereby, and projecting portions extending on opposite sides of said sleeve, a pulley firmly mounted upon said shaft, another pulley rotatably mounted upon one of said projecting portions, a holder for a milling tool, a support carrying said holder and carried by said frame, a third pulley rotatably mounted upon said support, a fourth pulley firmly connected with said holder and rotatable therewith, a drive extending over said pulley, means carried by the other one of said projecting portions and connected with said support for shifting said support and the holder carried thereby in relation to said frame from a position wherein the holder is located directly below the center of said shaft to a distance equal to the radius of the surface to be milled, said frame being swingable about the axis of said shaft.

ERIC A. THORSBERG.